United States Patent [19]

Althaus

[11] Patent Number: 5,557,919
[45] Date of Patent: Sep. 24, 1996

[54] METHOD OF OPERATING A GAS TURBINE INSTALLATION

[75] Inventor: Rolf Althaus, Flawil, Switzerland

[73] Assignee: ABB Management AG, Baden, Switzerland

[21] Appl. No.: 295,061

[22] Filed: Aug. 26, 1994

[30] Foreign Application Priority Data

Sep. 13, 1993 [DE] Germany .......................... 43 31 081.8

[51] Int. Cl.⁶ ................................................... F02C 3/02
[52] U.S. Cl. ........................................ 60/39.06; 60/39.45
[58] Field of Search ............................... 60/39.02, 39.06, 60/39.45 R, 39.45 A, 39.161, 39.52; 417/64

[56] References Cited

U.S. PATENT DOCUMENTS

| | | | |
|---|---|---|---|
| 2,407,166 | 9/1946 | Kreitner et al. | 60/39.06 |
| 2,738,123 | 3/1956 | Hussmann | 60/39.45 A |
| 3,398,525 | 8/1968 | Jenny | 60/39.45 A |
| 5,220,781 | 6/1993 | Keller | 60/39.02 |
| 5,282,354 | 2/1994 | Keller | 60/39.02 |
| 5,284,013 | 2/1994 | Keller | 60/39.45 A |

FOREIGN PATENT DOCUMENTS

| | | | |
|---|---|---|---|
| 212181 | 3/1987 | European Pat. Off. | 60/39.45 A |
| 0468083A1 | 1/1992 | European Pat. Off. | . |
| 0474893A1 | 3/1992 | European Pat. Off. | . |
| 0474894A1 | 3/1992 | European Pat. Off. | 60/39.45 |
| 2301865 | 7/1974 | Germany . | |

*Primary Examiner*—Timothy S. Thorpe
*Attorney, Agent, or Firm*—Burns, Doane, Swecker & Mathis

[57] ABSTRACT

In a method of operating a gas turbine installation in which the air prepared in a low-pressure compressor (1) is mixed with a fuel (4) downstream of the compression and is supplied to and burnt in a pressure-wave machine (3) operating with constant-volume or constant-pressure combustion and the working gas obtained in this manner is subsequently admitted to a high-pressure turbine (7) and a low-pressure turbine (8), there is an admixture of partially expanded and cooled gas from the high-pressure turbine (7) into the partial quantity flow led from the pressure-wave machine (3) to the low-pressure turbine (8). Fuel (4) is subsequently introduced and the mixture is burnt in a combustion chamber (9). A very high efficiency, very good part-load behavior and minimal $NO_x$ emission figures are achieved by means of this reheat.

4 Claims, 2 Drawing Sheets

5,557,919

METHOD OF OPERATING A GAS TURBINE INSTALLATION

BACKGROUND OF THE INVENTION

1. Field of the Invention

The invention relates to a method of operating a gas turbine installation in which the air prepared in a compressor is mixed with a fuel downstream of the compression and is supplied to and burnt in a pressure-wave machine operating with constant-volume or constant-pressure combustion and the working gas obtained in this manner is subsequently admitted to a high-pressure gas turbine and a low-pressure gas turbine.

2. Discussion of Background

Such methods for preparing the working gas in gas turbine installations are known.

As an example, a method is described in U.S. Pat. No. 5,197,276 to Keller in which the combustion of the fuel/air mixture takes place in the rotor cells of a pressure-wave machine at constant volume and a part of the working gas forming due to the combustion in the rotor cells is admitted to a high-pressure gas turbine and the remaining part from the rotor cells is admitted to a low-pressure gas turbine. In operation, a homogeneous distribution of fuel is generated in the longitudinal direction of the cells in the pressure-wave machine. This produces problems where both a low-pressure turbine and a high-pressure turbine are connected to this pressure-wave machine because an attempt is made to operate both turbines at the same optimum temperature in order to improve efficiency, even though the gases are supplied at different pressures to the high-pressure turbine and the low-pressure turbine.

A method of operating a gas turbine installation with a pressure-wave machine operating with constant-volume combustion is known to the applicant, and in this method the compressed air has different enrichment with fuel from layer to layer so that, for example, one layer has a rich fuel/air mixture and one layer has a weak fuel/air mixture. After combustion, the layers are expanded to the same temperature and the partial quantity more strongly enriched with fuel is supplied to the high-pressure turbine and the partial quantity less strongly enriched with fuel is supplied to the low-pressure turbine. This increases the efficiency of the installation relative to the method published in U.S. Pat. No. 197,376 to Keller.

A gas turbine installation is also known in which the hot gas flow from the low-pressure driving-gas conduit connected to the pressure-wave machine is mixed with the hot gas flow which emerges from the high-pressure turbine, i.e. with partially expanded and cooled gas from the high-pressure turbine. This mixing takes place in the low-pressure turbine or, in part, before entry into the low-pressure turbine. The inlet temperature of the gas into the low-pressure turbine is reduced by the mixing of hot gas flows of different temperatures, and this has an unfavorable effect on the efficiency.

SUMMARY OF THE INVENTION

Accordingly, the invention attempts to avoid all these disadvantages and one object of the invention is to provide a novel method of operating a gas turbine installation in accordance with the preamble to claim 1, which method exhibits minimal $NO_x$ emissions, very good part-load behavior and an improved efficiency relative to the known prior art.

According to the invention, this is achieved—in a method of operating a gas turbine installation in which the air prepared in a compressor is mixed with a fuel downstream of the compression and is supplied to and burnt in a pressure-wave machine operating with constant-volume or constant-pressure combustion, and the working gas obtained in this manner is subsequently admitted to a high-pressure gas turbine and a low-pressure gas turbine, there being an admixture of partially expanded and cooled gas from the high-pressure turbine into the partial quantity flow led from the pressure-wave machine to the low-pressure turbine before entry into the low-pressure turbine—by fuel being introduced subsequent to this admixture process and the mixture being then burnt in a combustion chamber.

The advantages of the invention exist inter alia in the high power density, the very high efficiency, the very good part-load behavior and the very low $NO_x$ emission figures.

It is particularly expedient for a part of the mixture of partially expanded and cooled exhaust gas from the high-pressure turbine and from the partial quantity flow led from the pressure-wave machine to the low-pressure turbine to be branched off before the introduction of fuel for reheating, for it to be mixed with a part of the air compressed in the compressor and for it to be returned via an exhaust gas conduit and a throttle butterfly into the low-pressure conduit shortly before entry into the pressure-wave machine.

It is an advantage that only minimal energy losses occur because of this exhaust gas recirculation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
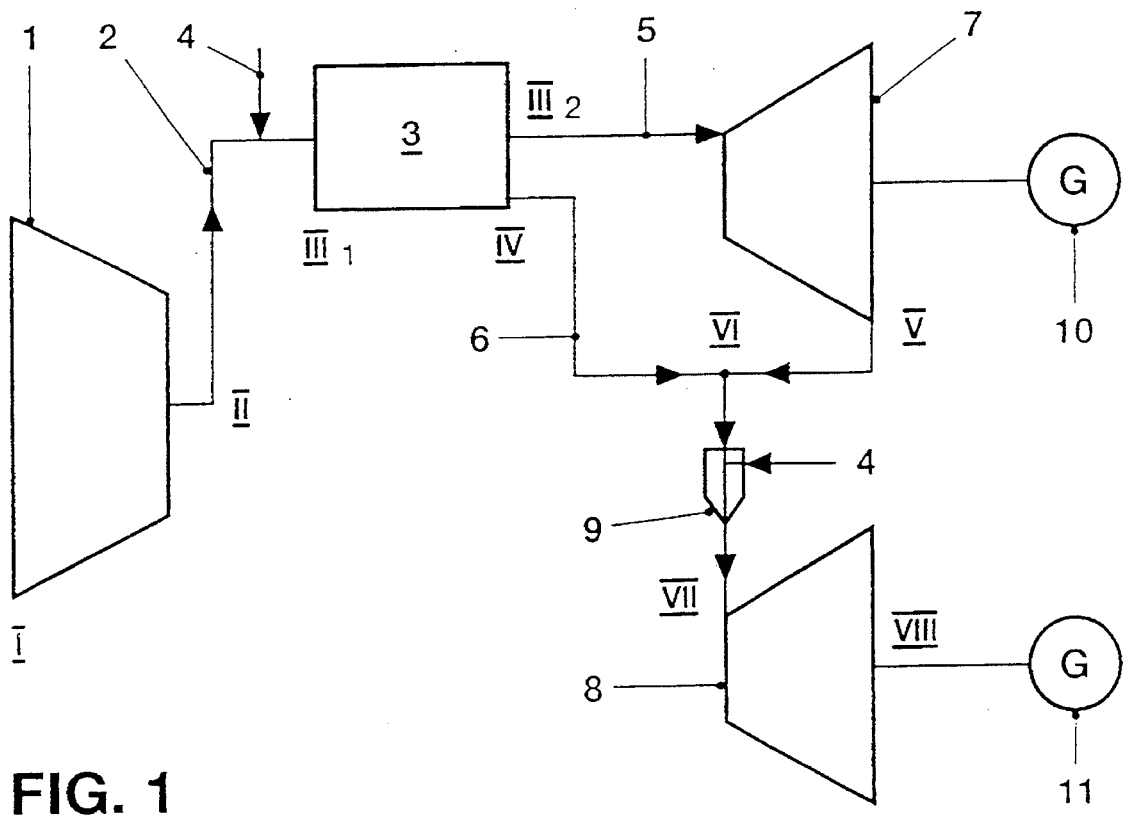
FIG. 1 shows a diagram of the method of operating a gas turbine installation with a pressure-wave machine operating with constant-volume combustion and without exhaust gas recirculation.
Figure 2:
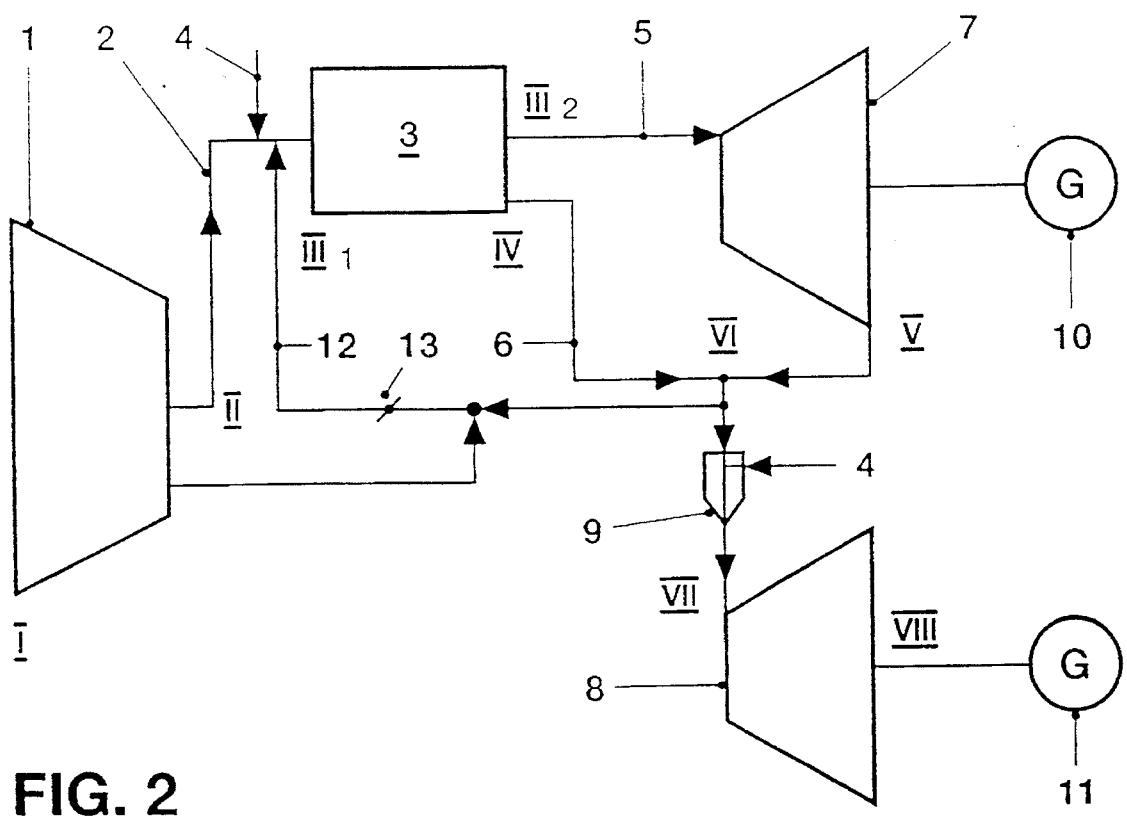
FIG. 2 shows a diagram of the method of operating a gas turbine installation with a pressure-wave machine operating with constant-volume combustion and with exhaust gas recirculation.
Figure 3:
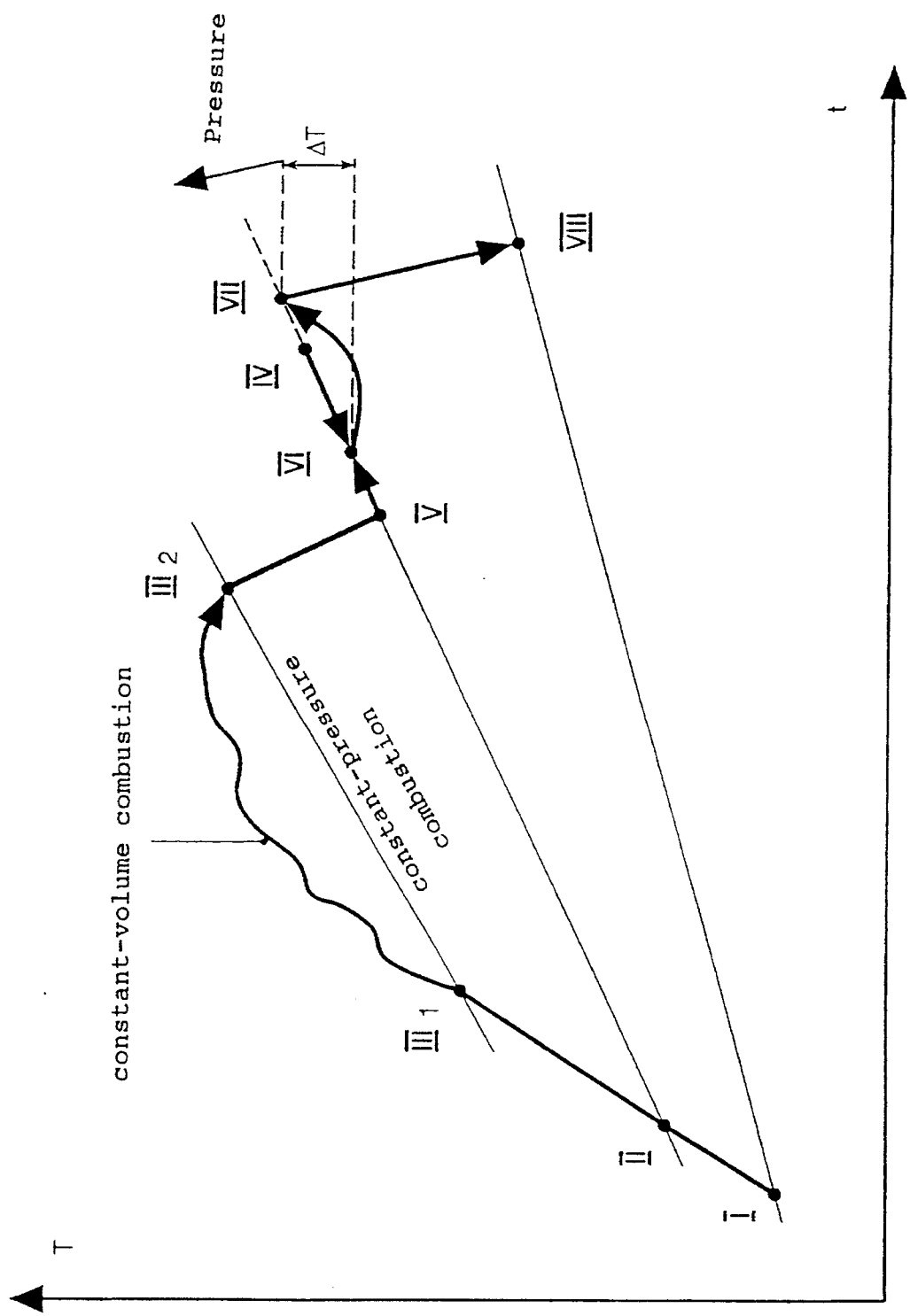
FIG. 3 shows a time/temperature diagram for the working gas.

Referring now to the drawings, wherein only the elements essential to understanding the invention are shown, where the flow direction of the working medium is indicated by arrows and wherein like reference numerals designate identical or corresponding parts throughout the several views, the invention is explained in more detail using embodiment examples and using FIGS. 1 to 3.

In the diagrammatically represented gas turbine installation in FIG. 1, a low-pressure compressor 1 delivers precompressed air via a low-pressure conduit 2 into a pressure-wave machine 3. The concept of low pressure should not be understood in an absolute manner in this case; it is only low in comparison with the rest of the pressure level of the gas turbine installation. There is an admixture of a fuel 4, natural gas for example, to the precompressed air before the pressure-wave machine 3. So that the installation can also operate under part-load conditions, the fuel supply nozzles can be switched on in stages. This is also important with respect to low $NO_x$ emission figures.

The fuel/air mixture passes into the pressure-wave machine 3 and is there burned under constant-volume conditions in known manner, as described for example in U.S. Pat. No. 5,197,276 to Keller. The gases prepared in this manner are then respectively admitted via a high-pressure driving-gas conduit 5 and a low-pressure driving-gas conduit 6 to the high-pressure turbine 7 and the low-pressure turbine 8, which drive the generators 10, 11.

The compressed air can, of course, also have different enrichment with fuel from layer to layer so that one layer has a rich fuel/air mixture and one layer has a weak fuel/air mixture. After combustion, the layers are expanded to the same temperature and the partial quantity more strongly enriched with fuel is supplied to the high-pressure turbine 7 and the partial quantity less strongly enriched with fuel is supplied to the low-pressure turbine 8.

After the high-pressure part, the gas from the low-pressure driving-gas conduit 6 is mixed with the partially expanded and correspondingly cooled gas. The gas from the low-pressure driving-gas conduit 6 may, under certain circumstances, be hotter. According to the invention, this mixture is reheated by the introduction of fuel 4, the gas being burnt in a combustion chamber 9. The gas prepared in this way is subsequently admitted to the low-pressure turbine 8. Because of the reheat, gas with a temperature at a higher level compared with the prior art is supplied to the low-pressure turbine 8 and this leads to an improvement in efficiency. These driving gases are then expanded in the low-pressure turbine 8 to a back pressure which corresponds to atmospheric pressure.

The curve of gas temperature plotted against time is shown in FIG. 3, the Roman numerals corresponding to the times or locations which are likewise designated by Roman numerals in the diagrammatic method of FIG. 1.

It may be seen from the time/temperature diagram represented in FIG. 3 that a temperature gain of ΔT before entry of the gas into the low-pressure turbine 8 is achieved by the reheat. The turbine is protected by this means, which has advantageous effects on the overall process. There are, furthermore, additional control possibilities present in the overall method due to the use of the further combustion chamber 9 according to the invention so that very good part-load behavior of the installation is achieved.

The method according to the invention can also, of course, be applied to gas turbine installations in which pressure-wave machines 3 are used which operate with constant-pressure combustion of the gas and drive the generators 10 and 11 by means of high-pressure turbines 7 and low-pressure turbines 8.

In another embodiment example (see FIG. 2), exhaust gas recirculation is additionally provided. The main advantage of this variant consists in the fact that only minimal energy losses occur. After the mixing of the partially expanded and correspondingly cooled exhaust gas from the high-pressure turbine 7 with the gas from the low-pressure driving-gas conduit 6, which gas may be hotter under certain circumstances, a part of this exhaust gas is branched off, is mixed with a part of the air compressed in the compressor 1 and is returned via an exhaust gas conduit 12 and a throttle butterfly 13 into the low-pressure conduit 2 shortly before entry into the pressure-wave machine. This raises the extinguishing limit of the burner, increases the efficiency of the installation and greatly reduces the $NO_x$ emissions, which should be as small as possible for environmental reasons. Mixing the relatively hot exhaust gas with a part of the cold air coming from the compressor 1 has the advantage that the exhaust gas conduit 12 is not too severely thermally loaded when the gases flow through it.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a gas turbine installation, comprising the steps of:

compressing air in a low-pressure compressor;

introducing a fuel into the compressed air downstream of the compressor;

directing the compressed air and fuel to a pressure-wave machine;

combusting the compressed air and fuel in the pressure-wave machine;

directing a high-pressure working gas produced in the pressure-wave machine via a high-pressure driving-gas conduit to a high-pressure turbine;

directing a low-pressure working gas produced in the pressure-wave machine to a low-pressure driving-gas conduit;

introducing partially expanded and cooled gas from an exhaust of the high-pressure turbine into the low-pressure working gas before entry into the low-pressure turbine;

introducing fuel into the low-pressure working gas and high-pressure turbine exhaust gas mixture and combusting the mixture in a combustion chamber; and, directing the combustion gas to the low-pressure turbine.

2. The method as claimed in claim 1, further comprising the steps of:

diverting a part of the mixture of partially expanded and cooled exhaust gas from the high-pressure turbine and the low-pressure working gas before the introduction of fuel to the mixture;

mixing the diverted gas with a part of air compressed in the compressor; and introducing the mixture via an exhaust gas conduit and a throttle butterfly into the low-pressure conduit before entry into the pressure-wave machine.

3. The method as claimed in claim 1, wherein the pressure-wave machine is operated with constant volume combustion.

4. The method as claimed in claim 1, wherein the pressure-wave machine is operated with constant pressure combustion.

* * * * *